United States Patent [19]

Kishimura et al.

[11] Patent Number: 4,755,553

[45] Date of Patent: Jul. 5, 1988

[54] PRIMER COMPOSITION FOR SUBSTRATES

[75] Inventors: Kotaro Kishimura, Ohtake; Riichiro Nagano, Hiroshima, both of Japan

[73] Assignee: Mitsui Petrochemical Industries, Ltd., Tokyo, Japan

[21] Appl. No.: 922,785

[22] Filed: Oct. 23, 1986

Related U.S. Application Data

[63] Continuation of Ser. No. 667,582, Nov. 2, 1984, abandoned.

[30] Foreign Application Priority Data

Nov. 2, 1983 [JP] Japan ............................... 58-204888

[51] Int. Cl.<sup>4</sup> .......................... C08L 51/06; C08F 8/18
[52] U.S. Cl. .................................. 524/531; 525/285; 525/327.4; 525/334.1; 525/356
[58] Field of Search .................. 525/285, 334.1, 327.4, 525/356; 524/531

[56] References Cited

U.S. PATENT DOCUMENTS 3,579,485  5/1971  Folzenlogen et al. ............... 525/285
4,299,754  11/1981  Shiomi et al. ....................... 524/531
4,599,385  7/1986  Clayton et al. ..................... 525/285

*Primary Examiner*—Wilbert J. Briggs, Sr.
*Attorney, Agent, or Firm*—Sherman and Shalloway

[57] ABSTRACT

A primer composition composed of 1 to 100 parts by weight of a chlorinated carboxyl group-containing α-olefin polymer and 100 parts by weight of an organic solvent therefor, the improvement wherein (i) said chlorinated carboxyl group-containing α-olefin polymer is a post-chlorination product [C] of a graft-modified propylene polymer [B] having a chlorine content of 10 to 35% by weight, said graft-modified propylene polymer [B] having an acid value of 6 to 187 mg-KOH/g-polymer and obtained by grafting an unsaturated dicarboxylic acid anhydride to a propylene polymer [A] having an intrinsic viscosity [η], determined at 135° C. in decalin, of 0.6 to 10 dl/g and comprising 70 to 100 mole % of propylene and 0 to 30 mole % of an α-olefin other than propylene, and (ii) said solvent is an organic solvent boiling at about 60° to about 200° C.

6 Claims, No Drawings

PRIMER COMPOSITION FOR SUBSTRATES

This application is a continuation of application Ser. No. 667,582, filed Nov. 2, 1984, now abandoned.

This invention relates to a composition useful as a primer for substrates in coating substrates of olefin polymer molded articles, applying adhesives or varnishes to varying substrates and depositing aluminum and other metals onto varying substrates.

More specifically, this invention relates to a primer composition composed of 1 to 100 parts by weight of a chlorinated carboxyl group-containing α-olefin polymer and 100 parts by weight of an organic solvent therefor, characterized in that (i) said chlorinated carboxyl group-containing α-olefin polymer is a post-chlorination product [C] of a graft-modified propylene polymer [B] having a chlorine content of 10 to 35% by weight, said graft-modified propylene polymer [B] having an acid value of 6 to 187 mg-KOH/g-polymer and obtained by grafting an unsaturated dicarboxylic acid anhydride to a propylene polymer [A] having an intrinsic viscosity [η], determined at 135° C. in decalin, of 0.6 to 10 dl.g and comprising 70 to 100 mole% of propylene and 0 to 30 mole% of an α-olefin other than propylene, and (ii) said solvent is an organic solvent boiling at about 60° to about 200° C.

Said primer composition for substrates is particularly useful as a primer for coating olefin polymer molded articles, and exhibits improved properties such that it is excellent in adhesion or deposition to substrates and paints, solvent resistance, water resistance and gasoline resistance.

For instance, on the surface of olefin polymer molded articles such as polypropylene molded articles, coated films or coating layers of other resins are formed to enhance an additional value of the olefin polymer molded articles.

However, the olefin polymer molded articles have low polarity and are poor in adhesion to general paints. It is therefore known that their affinity for paints on the surface of the olefin polymer molded articles is improved with chromating treatment, flame treatment, solvent treatment, etc.

Nevertheless, these methods have drawbacks in that since they require intricate treatments or use corrosive chemicals, they involve danger, and a severe process control is needed to impart a stable adhesion with good quality reproducibility.

As an effective means to remedy these drawbacks, there is a method of treating the surface of the molded articles with primers, and various types of primers have been proposed. One of the typical primers is obtained by dissolving chlorinated polypropylene as a bonding component in an organic solvent. However, this shows insufficient adhesion between the chlorinated polypropylene and the paint and is not practical.

There have been known a variety of proposals to conquer such a defect. For example, U.S. Pat. No. 3,579,485 (corresponding to British Pat. No. 1,308,231) discloses chlorinated carboxyl group-containing α-olefin polymers which are capable of forming coatings and primers for α-olefin polymers.

The above proposal describes a primer composition composed of a chlorinated carboxyl group-containing α-olefin polymer and an organic solvent therefor, and post-chlorination products of graft-modified α-olefin polymers obtained by grafting unsaturated polycarboxylic acids, anhydrides or esters thereof to α-olefin polymers are shown as said chlorinated carboxyl group-containing α-olefin polymer.

Said proposal involves the use of, as a starting α-olefin polymer, a low viscosity poly-α-olefin, above all, a suitable low viscosity poly-α-olefin having a melt viscosity range from about 100 to 5,000 cp at 190° C. (ASTM-D 128-57 T using 0.04±0.0002 inch orifice) and an inherent viscosity of about 0.1 to 0.5 dl/g, measured in tetralin at 145° C. The very proposal however does not mention or hint the use of a propylene polymer [A] having an intrinsic viscosity [η], determined at 135° C. in decalin, of 0.6 to 10 dl/g which is essential to form a post-chlorination product of a graft-modified propylene polymer specified in (i) of the primer composition of this invention. The intrinsic viscosity [η] of 0.6 to 10 dl/g corresponds to an inherent viscosity of 0.55 to 6.5 dl/g determined at 145° C. in tetralin. Moreover, according to the study of the present inventors, it has been found that since a coated film afforded by using the primer composition in this proposal is not satisfactory in water resistance and gasoline resistance, it cannot be put to practical use in the field requiring such properties.

Another proposal is given in Japanese Patent Publication No. 33959/76 (published on Sept. 22, 1976). This proposal pertains to a process for producing a chlorination product of a thermoplastic, crosslinkable graft-modified polyolefin having a good stability characterized in that a graft-modified polyolefin with an acid value of 5 to 150 obtained by introducing into a polyolefin a monomer having one ethylenically unsaturated bond and at least one carboxyl group in a molecule through a grafting reaction is chlorinated until the chlorine content reaches 10 to 75% by weight for producing a post-chlorination product of a graft-modified polyolefin having an improved stability.

This proposal illustrates acrylic acid, methacrylic acid and maleic acid as said graft monomer, yet does not touch upon the use of acid anhydrides at all. Though there is nothing in said proposal to describe an intrinsic viscosity [η] of the starting polyolefin making up said graft modified polyolefin, a graft-modified polyethylene having a molecular weight of 2,000 and obtained by grafting an acrylic acid monomer and a graft-modified polypropylene having a molecular weight of 4,000 and obtained by grafting a methacrylic acid monomer are illustrated as graft-modified polyolefins. The propylene polymer [A] having the intrinsic viscosity [η], determined at 135° C. in decalin, of 0.6 to 10 dl/g which is essential to form the post-chlorination product of the graft-modified propylene polymer in the primer composition of this invention as described in (i) has the molecular weight in the order of about 50,000 to about 2,000,000. Viewed from formation of the graft-modified polyolefins having extremely low molecular weight in said proposal, the starting polyolefins in this proposal are found to have also extremely low molecular weight. The same proposal does not refer to the improvement in gasoline resistance either.

Further, Japanese Patent Publication No. 4231/75 proposes using a polymer obtained by grafting a monomer containing a carboxyl group, etc. to a specific pre-chlorinated polypropylene in order to better adhesion of polypropylene molded articles. However, the polymer formed by this method contains a gel in many cases and is poor in appearance of a coated film and the aforesaid gasoline resistance.

Still further, Japanese Laid-open Patent Application No. 118809/83 proposes a process for producing a primer for propylene resins characterized in that an unsaturated carboxylic acid or its anhydride is grafted to a pre-chlorination product using as a starting material a polyolefin such that at least 10 g thereof is disolved in 100 ml of toluene at 110° C. and 1 atm. The primer of this proposal, as in said Japanese Patent Publication No. 4231/75, suffers also from the defect that since the post-grafted polymer of the pre-chlorinated polyolefin is used as a resin component of the primer, said primer contains gel.

The present inventors have made studies on a primer composition for substrates having improved properties by conquering the disadvantages of the above conventional proposals.

As a result, they have found that a primer composition for substrates excellent in adhesion to coating layers applied to substrates or primer layers, such as a paint layer, adhesive layer, varnish layer, metallic deposit layer, etc. as well as in solvent resistance, water resistance and gasoline resistance can be provided by using as a resin component a post-chlorination product [C] of a graft-modified propylene polymer [B] having a chlorine content of 10 to 35% by weight, said product [C] being obtained by using as a starting propylene polymer a propylene polymer [A] having an intrinsic viscosity $[\eta]$, determined at 135° C. in decalin, of 0.6 to 10 dl/g, preferably 1 to 5 dl/g and comprising 70 to 100 mole% of propylene and 0 to 30 mole% of an α-olefin other than propylene, grafting an unsaturated dicarboxylic acid anhydride to said propylene polymer [A] in a manner known per se, and subjecting the resulting graft-modified propylene polymer [B], having an acid value of 6 to 187 mg-KOH/g-polymer, to post-chlorination in a manner known per se. Moreover, the present inventors have come to know a surprising result that, in a post-chlorination product of a graft-modified propylene polymer obtained by grafting an unsaturated dicarboxylic acid anhydride to a propylene polymer (A) which product meets the combination parameter specified in (i), the above satisfactory improvement is not obtained if said anhydride is replaced with its corresponding acid.

Accordingly, an object of this invention is to provide a primer composition for substrates having the above-described improved properties.

The above object and many other objects as well as advantages of this invention will be more clarified by the following description.

A primer composition composed of (1) a chlorinated carboxyl group-containing α-olefin polymer and (2) an organic solvent therefor is generally known as the conventional proposals have been earlier introduced.

The present invention features that the primer composition containing 1 to 100 parts by weight of (1) and 100 parts by weight of (2) satisfys a combination of the post-chlorination product [C] to meet the following requirement (i) and the organic solvent to meet the following requirement (ii).

(i) The chlorinated carboxyl group-containing α-olefin polymer is a post-chlorination product [C] of a graft-modified propylene polymer [B] having a chlorine content of 10 to 35% by weight, said polymer [B] having an acid value of 6 to 187 mg-KOH/g-polymer and obtained by grafting an unsaturated dicarboxylic acid anhydride to a propylene polymer [A] having an intrinsic viscosity $[\eta]$, determined at 135° C. in decalin, of 0.6 to 10 dl/g and comprising 70 to 100 mole% of propylene and 0 to 30 mole% of an α-olefin other than propylene.

(ii) Said solvent is an organic solvent boiling at about 60° to about 200° C.

In this invention, a starting propylene polymer [A] used to form a graft-modified propylene polymer [B] having an acid value of 6 to 187 mg-KOH/g-polymer comprises 70 to 100 mole% of propylene and 0 to 30 mole%, preferably 0 to 15 mole% of an α-olefin other than propylene.

Said propylene polymer [A] may further be copolymerized, if required, with other monomers such as acrylic acid, acrylic acid ester, 1-undecenol, 1-undecylenic acid, styrene, p-methylstyrene, vinyl acetate, vinyl alcohol and vinyl chloride. The amount thereof can be about 0.1 to about 10 moles per 100 moles as the total amount of propylene and α-olefin other than propylene.

Examples of the α-olefin other than propylene which may be contained in the amount up to 30 mole% are $C_4$–$C_8$ α-olefins such as 1-butene, 1-pentene, 1-hexene, 2-methyl-1-butene, 3-methyl-1-pentene, 4-methyl-1-pentene, 1-heptene and 1-octene. Of these, ethylene, 1-butene, 3-methyl-1-butene and 4-methyl-1-pentene are more preferable. These α-olefins other than propylene may singly constitute a propylene polymer [A] together with propylene or two or more thereof may be constituting components of the propylene polymer [A] together with propylene. The propylene polymer [A] may be in the form of a random copolymer of individual constituting component units or of a variety of block copolymers thereof. Preferable examples of the propylene polymer [A] are an isotactic polypropylene, propylene-ethylene copolymer, propylene-1-butene copolymer, propylene-4-methyl-1-pentene copolymer, etc.

In this invention, said propylene polymer [A] has an intrinsic viscosity $[\eta]$, determined at 135° C. in decalin, of 0.6 to 10 dl/g, preferably 1 to 5 dl/g. Said intrinsic viscosity $[\eta]$ corresponds to an inherent viscosity, determined at 145° C. in tetralin, of 0.55 to 6.5 dl/g, preferably 0.9 to 3.5 dl/g. The propylene polymer [A] having the intrinsic viscosity $[\eta]$, determined at 135° C. in decalin, iof 0.6 to 10 dl/g has the molecular weight in the order of about 50,000 to about 2,000,000. The melt viscosity of the propylene polymer [A] determined at 190° C. by ASTM-D 1238-57 T using 0.04±0.0002 inch orifice is preferably at least 7,000 cp, more preferably at least 50,000 cp but at most $2 \times 10^7$ poise.

In the case of a propylene polymer [A] having a propylene content of less than 70 mole% and the intrinsic viscosity $[\eta]$ of less than 0.6 dl/g, even if a post-chlorination product [C] of a graft-modified propylene polymer [B] having a chlorine content of 10 to 35% by weight, said polymer [B] having an acid value of 6 to 187 mg-KOH/g-polymer and obtained by grafting an unsaturated dicarboxylic acid anhydride to a propylene polymer [A] as specified in the requirement (i) is formed from said propylene polymer [A] and used in a primer composition, the primer composition is unsatisfactory in water resistance and gasoline resistance.

Meanwhile, in the case of a propylene polymer [A] having an intrinsic viscosity $[\eta]$ in excess of 10 dl/g, even if a post-chlorination product [C] to meet the other conditions in the requirement (i) as above is formed and dissolved in a suitable amount of a solvent, it is hard to coat because of too high a viscosity, and poor in adhesion of a coated film.

In the present invention, examples of the acid anhydride employed to form the graft-modified propylene polymer [B] having the acid value of 6 to 187 mg-KOH/g-polymer and obtained by grafting the unsaturated dicarboxylic acid anhydride to the above-described propylene and polymer [A] include $C_4$–$C_{10}$ unsaturated dicarboxylic acid anhydrides such as maleic anhydride, itaconic anhydride, citraconic anhydride, allylsuccinic anhydride, glutaconic anhydride, Nadic Anhydride, methylnadic anhydride, tetrahydrophthalic anhydride and methyltetrahydrophthalic anhydride. These acid anhydrides are usable either singly or as a mixture of two or more thereof. Of these acid anhydrides, maleic anhydride and Nadic Anhydride are more preferred.

The acid value of the resulting graft-modified propylene polymer [B] is 6 to 187 mg-KOH/g-polymer, preferably 12 to 120 mg-KOH/g-polymer. Where the acid value is less than 6 mg-KOH/g-polymer, adhesion to coating layers applied to substrates an primer layers becomes poor. Where it exceeds 187 mg-KOH/g-polymer, $[\eta]$ of the graft-modified propylene polymer [B] or $[\eta]$ of its post-chlorination product gets low which results in decrease of mechanical strength. Besides, the adhesion, water resistance and gasoline resistance of the coated film worsen.

The graft-modified propylene polymer [B] can be formed by grafting the above-described unsaturated dicarboxylic acid anhydride monomer to the foregoing propylene polymer [A]. A method of producing such graft copolymer is well known per se as disclosed in e.g. the prior arts introduced above and can be utilized in the present invention.

Examples of said method are a method wherein the propylene polymer [A] is dissolved in an organic solvent, said monomer and a radical generating agent are added, and the mixture is stirred under heating to perform graft copolymerization, a method wherein the respective components are fed to an extruder and graft-copolymerized, and so forth.

The radical generating agent used in the graft reaction is also well known, and any radical generating agents will do if they expedite the reaction between the propylene polymer [A] and the monomer. Preferable examples of the radical initiating agents are organic peroxides and organic peresters. Concrete examples thereof can be known radical generators, e.g. organic peroxides such as benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene and lauroyl peroxide; organic peresters such as tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butylper-sec-octoate, tert-butyl perpivalate, cumyl perpivalate and tert-butyl perdiethylacetate; and azo compounds such as azobisisobutylnitrile and dimethyl azoisobutyrate. Of these, preferable are dialkyl peroxides such as dicumyl peroxide, di-tert-butyl peroxide, 2,5-dimethyl-2,5-di(tert-butylpkeroxy)hexyne-3, 2,5-dimethyl-2,5-di(tert-butylperoxy)hexane, and 1,4-bis(-tert-butylperoxyisopropyl)benzene.

Of the above-described graft copolymerization methods, the former embodiment using the organic solvent is employed preferably. Examples of the organic solvent are aromatic hydrocarbons such as benzene, toluene and xylylene, aliphatic hydrocarbons such as hexane, heptane, octane and decane, and chlorinated hydrocarbons such as chlorobenzene and carbon tetrachloride. The aromatic hydrocarbons are most preferred.

As for the reaction conditions, the heating temperature is, for example, about 100° to about 160° C., and the reaction time is, for example, 2 to 10 hours. The grafting amount of the monomer can be controlled chiefly by the amount of the monomer supplied. Moreover the grafting amount of the monomer can be found by the quantitative determination of the oxygen content in the polymer or the measurement of an acid value through titration.

Of the above-described graft copolymerization methods, the latter embodiment reacts the propylene polymer [A] with the monomer and the radical generating agent in a molten state on heating. The reaction temperature is usually about 100° to about 350° C.

These components may be kneaded either continuously on extrusion with a monoaxial screw extruder or twin screw extruder, or batchwise with a Banbury mixer. The kneading time is commonly 0.1 minute to 1 hour.

As described above, the unsaturated dicarboxylic acid anhydrides are employed as graft monomers in the present invention. The reason is not clear, but if a post-chlorination reaction product of a graft-modified propylene polymer obtained by grafting the unsaturated dicarboxylic acid to the propylene polymer is used which is prepared to meet the conditions in the requirement (i) of this invention except using the corresponding unsaturated dicarboxylic acid, it is impossible to obtain a primer composition having excellent improved properties of this invention as demonstrated in Example 10 and Comparative Example 9 shown in Table 2.

This invention uses the post-chlorination product [C] of the above graft-modified propylene polymer [B] having the chlorine content of 10 to 35% by weight. Said post-chlorination product [C] can be formed by chlorinating the graft-modified propylene polymer [B] in a manner known per se.

The post-chlorination of the graft-modified propylene polymer [B] can be carried out with a uniform solvent system obtained by completely dissolving said polymer [B] in the solvent. Examples of the solvent include aliphatic hydrocarbons such as hexane, heptane, octane, decane, dodecane, tetradecane and petroleum; alicyclic hydrocarbons such as methylcyclopentane, cyclohexane, methylcyclohexane, cyclooctane and cyclododecane; aromatic hydrocarbons such as benzene, toluene, xylene, ethylbenzene, cumene, ethyltoluene, trimethylbenzene, cumene and diisopropylbenzene; and halogenated hydrocarbins such as chlorobenzene, bromobenzene, o-dichlorobenzene, carbon tetrachloride, carbon tetrabromide, chloroform, bromoform, trichloroethane, trichloroethylene, tetrachloroethane and tetrachloroethylene. Of these, the halogenated hydrocarbons are more preferred.

The post-chlorination of the graft-modified propylene polymer [B] can be performed such that while thoroughly stirring the uniform solution of the graft-modified propylene polymer [B] dissolved in the solvent, a chlorine gas is added thereto until the given chlorine content is reached. In conducting the post-chlorination reaction, radical generating agents may be used, or ultraviolet light or visible light may be irradiated to expedite the reaction effectively. The same radical generating agents shown for formation of the graft-modified propylene polymer [B] are available in this case as well. Alternatively, there may be employed also a method wherein a chlorinated product is yielded without the addition of the radical generating agents or the irradiation of ultraviolet light or visible light. The temperature of the post-chlorination reaction is, for example, about 50° to about 160° C., and the reaction time is, for example, about 0.5 to 5 hours.

The chlorine content of the post-chlorination product [C] is 10 to 35% by weight, preferably 20 to 30% by weight. When the chlorine content is less than 10% by weight, a solubility of the product [C] in the organic solvent is insufficient, a uniform primer is not obtainable and a coated film of the primer gets non-uniform.

When a post-chlorination product [C] having the chlorine content in excess of 35% by weight, a gasoline resistance of the coated film after applying a top coat such as paints, etc. decreases. Moreover, when the chlorine content of the product [C] is too high, adhesion to substrates such as olefin polymer molded articles decreases undesirously.

The chlorine content in the post-chlorination product (C) is determined as follows, for example. That is, about 10 mg of the product [C] is completely burned in an oxygen flask, and the chlorine portion is absorbed in water as hydrogen chloride. Subsequently, $AgNO_3$ is added to the aqueous hydrogen chloride solution and the precipitate of silver chloride is recovered. The fluorescent X-ray spectrum of the silver chloride reveals the chlorine content (% by weight) of the post-chlorination product [C].

The primer composition of this invention is composed of, as described above, 1 to 100 parts by weight of the post-chlorination product [C] of the graft-modified propylene polymer [B] having the chlorine content of 10 to 35% by weight, said polymer [B] having an acid value of 6 to 187 mg-KOH/g-polymer and obtained by grafting the unsaturated dicarboxylic acid anhydride to the propylene polymer [A] having the intrinsic viscosity [$\eta$], determined at 135° C. in decalin, of 0.6 to 10 dl/g and comprising 70 to 100 mole% of propylene and 0 to 30 mole% of the α-olefin other than propylene, and 100 parts by weight of the organic solvent boiling at about 60° to about 200° C.

Examples of the above organic solvent include aromatic hydrocarbins such as toluene, xylene and benzene; alicyclic hydrocarbons such as cyclohexane, ethylcyclohexane, methylcyclohexane and cyclohexene; ketones such as methyl ethyl ketone, methyl isobutyl ketone, diisobutyl ketone and cyclohexanone; esters such as ethyl acetate, butyl acetate and cellosolve acetate; halogenated hydrocarbons such as carbon tetrachloride, trichloroethylene, perchloroethylene and chloroform; ethers such as tetrahydrofuran and ethyl ether; and amides such as dimethylformamide. These compounds can be used singly or as a mixture of two or more thereof.

The primer composition of this invention can further contain, if required, varying additives besides the post-chlorination product [C] of the graft-modified propylene polymer [B] and the organic solvent therefor. Examples of the additives can be other resins soluble or insoluble in the solvent, plasticisers, antioxidants, ultraviolet absorbers, antistatic agents, slip agents, lubricants, fire retardants, hydrochloric acid absorbers organic or inorganic pigments or metal powders, viscosity modifiers, thixotropy modifiers and anti-sag agents.

Examples of the other resins are polyolefin polymers such as polyethylene, polypropylene, an ethylene-propylene copolymer, polybutene-1, poly-4-methyl-1-pentene and ethylene-vinyl acetate copolymer, chlorination products of these polyolefins, a saponification product of an ethylene-vinyl acetate copolymer, polyesters, alkyd resins, epoxy resins, polyurethane resins, acrylic resins and styrene resins.

Examples of the plasticizers are methyl phthalyl ethyl glycolate, ethyl phthalyl ethyl glycolate, 3-(2-xenoxy)-1,2-epoxypropane, di-(α-phenyl ethyl)ether, a lower alkyl ester of phthalic acid such as dibutyl phthalate, and esters of adipic acid and sebacic acid.

Examples of the antioxidants are 2,6-di-t-butyl-p-cresol, o-t-butyl-p-cresol, tetrakis-[methylene-3-(3,5-di-t-butyl-4-hydroxyphenyl)propionate]methane, β-naphthylamine and p-phenylenediamine.

Examples of the ultraviolet absorbers are 2,4-dihydroxybenzophenone, 2-(2'-hydroxy-3',5'-di-t-butylphenyl)-5-chlorobenzotriazole, 2-(2-hydroxy-3-t-butyl-5-methylphenyl)-5-chlorobenzotriazole and bis(2,2',6,6')tetramethyl-4-piperidine)sebacate.

Examples of the antistatic agents are lauryl diethanolamine, palmityl diethanolamine, stearyl diethanolamine, oleyl diethanolamine, behenyl diethanolamine, polyoxyethylene alkylamines, stearyl monoglyceride, and 2-hydroxy-4-n-octoxybenzophenone.

Examples of the slip agents are stearamide, oleamide and erucamide.

Examples of the lubricants are calcium stearate, zinc stearate, aluminum stearate, magnesium stearate, and polyethylene wax.

Examples of the fire retardants are antimony oxide, decabromobiphenyl ether, and bis(3,5-dibromo-4-bromopropyloxyphenyl)sulfone.

Examples of the hydrochloric acid absorbers are an epoxidized soybean oil, metal salt of stearic acid, tribromopholsphate, tetrasodium pyrophoslphate, 4'-tert-butyl phenyl salicylate, tetrasodium pyrophosphate, disodium o-phosphate, pyrophosphate, and o-phosphate and phosphite of an alkali metal.

Examples of organic pigments or metallic powders are titanium dioxide ($TiO_2$), zinc white (zinc oxide; ZnO), zinc sulfide (ZnS), carbon black, zinc dust, silicon carbide (SiC), red oxide of iron ($Fe_2O_3$), red lead (minimum, $Pb_3O_4$), umber ($Fe_2O_3$, $MnO_2$, $Mn_3O_4$), chrome yellow (lead chromate; $PbCrO_4$), cadmium yellow (CdS), chrome green (mixture of chrome yellow and prussian blue), chromium oxide green ($Cr_2O_3$), prussian blue (iron blue; $KFe^{3+}[Fe^{2+}(CN)_6]$), cobalt blue ($CoO.nAl_2O_3$), aluminum powder, silver powder, bronze powder, zinc powder and gold powder.

Examples of organic powders are aniline black, naphthol yellow S, Hansa Yellow 10G, benzidine yellow, permanent orange, persian orange, permanent brown FG, para brown, permanent red 4R, para red, fire red, alkali blue lake, phthalocyanine blue, indigo, green gold and phthalocyanine green.

Examples of the viscosity modifiers, thixotropy modifiers and anti-sag agents are a metallic soap, silica gel and bentonite.

The amounts of the above-described additives can be optionally selected on the basis of the total amount of the post-chlorination product [C] of the graft-modified propylene polymer [B] and the organic solvent therefor. For instance, the amount of the other resins is about 0.01 to about 50% by weight. The amount of the plasticisers is about 0.01 to about 5% by weight. The amount of the antioxidants, ultraviolet absorbers, antistatic agents, slip agents, lubricants, fire retardants or hydrochloric acid absorbers is about 0.01 to about 5% by weight. The amount of the pigments or metallic powders is about 0.01 to about 10% by weight. The amount of the viscosity modifiers, thixotropy modifiers or anti-sag agents is about 0.01 to about 10% by weight.

The primer composition of this invention is useful as a primer for substrates in coating substrates of olefin polymer molded articles, applying adhesives or varnishes to varying substrates and depositing aluminum and other metals onto varying substrates. Above all, said composition is desirously utilizable as a primer for coating the substrates of olefin polymer molded articles.

The primer composition of this invention can be applied in a manner known per se such that coating is effected by a method such as spraying, brushing, roll coating or dipping, followed by air-drying or force-drying on heating.

Paints can be coated on the substrates of e.g. olefin polymer molded articles surface-treated by the primer of this invention as above through any known methods such as electrostatic deposition, spray coating and brushing. These paints may be applied by recoating. The paints used are not limited in particular. However, when a coated film having a high adhesion to paints is especially required, it is advisable to use solvent-type thermoplastic acrylic resin paints, solvent-type thermosetting acrylic resin paints, acryl-modified alkyd resins, epoxy resin paints and polyurethane paints.

Coated films on substrates of e.g. olefin polymer molded articles on which these paints are coated can be dried or cured by suitable heating means such as heating with electric heat, heating with infrared rays and dielectric heating. The heating conditions may be easily selected by one of skill in the art depending on materials or forms of the olefin polymer molded articles, properties of paints, etc.

Examples of the olefin polymer molded articles suited for the treatment with the primer of this invention are molded articles of homopolymers of ethylene, propylene, 1-butene, 1-pentene, 4-methyl-1-pentene, styrene, α-methylstyrene, etc., copolymers of two or more of these compounds, or copolymers of these compounds with other monomers polymerizable with these compounds. The primer of this invention is desirously applied to the propylene polymer molded articles out of the above-described molded articles. These polymers may be blended with, before molding, other polymers than the olefin polymer as well as a variety of commonly used additives such as heat-resistant stabilizers, weatherable stabilizers, antistatic agents, lubricants, slip agents, nucleating agents, fire retardants, pigments, dyestuffs, and organic or inorganic reinforcing agents or fillers by suitable manners known per se. Examples of the organic or inorganic reinforcing agents or fillers are glass fibres, carbon fibers, potassium titanate fibers, wollastonite, calcium carbonate, calcium sulfate, talc, glass flakes, barium sulfate, clay, kaolin, finely divided silica, mica, calcium silicate, aluminum hydroxide, magnesium hydroxide, aluminum oxide and magnesium oxide. Various known molding methods such as extrusion molding, hollow molding, injection molding, compression molding and rotary molding are available in providing the olefin polymer molded articles to which the primer of this invention is applied.

The following Examples and Comparative Examples illustrate the composition of this invention in more detail.

EXAMPLE 1

(1) Preparation of a graft-modified propylene polymer [B] obtained by grafting maleic anhydride to a propylene polymer [A]:

Using polypropylene having an intrinsic viscosity [$\eta$], determined at 135° C. in decalin, of 1.9 dl/g, a 25 wt.% toluene solution was formed, and a graft reaction of maleic anhydride was carried out at 125° C. for 6 hours with dicumyl peroxide as a radical generating agent. Excess acetone was added to the reaction mixture, and the polymer was precipitated and separated by filtration. The filtrate was repeatedly washed with acetone and then vacuum dried to afford maleic anhydride graft-modified polypropylene having the maleic anhydride content of 3.0% by weight (acid value 35 mg-KOH/g-polymer).

(2) Preparation of a post-chlorination product [C] of said graft-modified propylene polymer [B]:

The maleic anhydride graft-modified polypropylene obtained in (1) above was completely dissolved in a chlorobenzene solvent at 110° C. While intersecting light, a chlorine gas was introduced into the solution at the same temperature, and post-chlorination was performed until the chlorine content reached 25% by weight. The reaction time was about 2 hours. Excess methanol was added to the reaction mixture and the polymer was precipitated and separated by filtration. The filtrate was repeatedly washed with methanol, and vacuum dried under a nitrogen stream to obtain a post-chlorination product of maleic anhydride graft-modified polypropylene.

(3) Preparation of a primer composition:

Ten grams of the post-chlorination product obtained in (2) above was dissolved in 100 ml of toluene to form a toluene solution. Solubility was tested by estimating a uniformity at 25° C. of said solution with an unaided eye. The results are shown in Table 1.

Subsequently, the polypropylene molded article was coated with a primer composed of a solution of 150 g of said post-chlorination product [C] in 1 l of toluene.

The surface of an injection-molded plate of polypropylene (Polypro ®SJ313: a trade name for a product of Mitsui Petrochemical Industries, Ltd.) was cleansed and degreased with a vapor of 1,1,1-trichloroethane for 30 seconds. The 50 g/l toluene solution of the post-chlorination product [C] was spray-coated onto the resulting plate and air dried at room temperature for about 5 minutes to form a primer coated film. Subsequently, an urethane-type paint (R-230 Purered: a trade name for a product of Nippon Beechemical Co., Ltd.) was spray-coated and the coated product was dried in an air oven at 80° C. for 30 minutes on baking. After the resulting coated product was left to stand at room temperature for 3 days, a variety of the following adhesions were tested. The results are shown in Table 1.

[Initial adhesion]

It was measured by a crosscut test according to JIS K5400 6.15.

[Adhesion after treatment of water resistance]

It was measured by dipping the coated product in a warm water of 40° C. for 1000 hours and then subjecting it to the above crosscut test.

[Adhesion after treatment of gasoline resistance]

It was measured by dipping the coated product in a regular gasoline of 25° C. for 24 hours and then subjecting it to the above crosscut test.

EXAMPLES 2–9 AND COMPARATIVE EXAMPLES 1–8

A propylene polymer [A] shown in Table 1 was graft-modified as in Example 1 with a graft monomer shown in Table 1 to afford a graft-modified polymer shown in Table 1. The graft-modified polymer was then subjected to the post-chlorination as in Example 1 to obtain a post-chlorination product of the graft-modified polymer shown in Table 1. Solubility and adhesion of a coated film were tested as in Example 1, and the results are shown in Table 1.

prepared in Example 1, and the mixture was stirred with a homomixer to obtain a white-colored, uniform primer shown in Table 2. The adhesion of the coated film using this primer is shown in Table 2.

COMPARATIVE EXAMPLE 9

A graft-modified polymer (acid value 35 mg-KOH/g) was prepared as in Example 1 except using maleic acid instead of maleic anhydride, and then subjected to the post-chlorination as in Example 1 to afford a post-chlorination product. A toluene solution of the resulting post-chlorination product was formed as in Example 1. Solubility of the post-chlorination product is shown in Table 2. In the same way as in Example 10, titanium oxide was added to color the toluene solution

TABLE 1

| | Starting propylene polymer [A] | | | | Graft modified polymer [B] | | |
|---|---|---|---|---|---|---|---|
| | Propylene content (mole %) | Comonomer | $[\eta]$ (dl/g) | $\eta 190°$ C. (cp) | Graft monomer | (wt %) | Acid value (mg-KOH/g) |
| Example | | | | | | | |
| 1 | 100 | — | 1.9 | $2 \times 10^6$ | Maleic anhydride | 3.0 | 35 |
| 2 | 100 | — | 1.9 | $2 \times 10^6$ | " | 1.5 | 17 |
| 3 | 100 | — | 1.9 | $2 \times 10^6$ | " | 7.3 | 83 |
| 4 | 100 | — | 1.9 | $2 \times 10^6$ | " | 3.0 | 35 |
| 5 | 100 | — | 3.5 | $2.8 \times 10^8$ | " | 2.0 | 22 |
| 6 | 95 | Ethylene | 2.8 | $1.1 \times 10^7$ | " | 3.4 | 39 |
| 7 | 75 | 1-Butene | 1.7 | $1.1 \times 10^6$ | " | 3.6 | 41 |
| 8 | 100 | — | 1.9 | $2 \times 10^6$ | Nadic Anhydride | 2.2 | 15 |
| 9 | 100 | — | 1.9 | $2 \times 10^6$ | Itaconic anhydride | 1.9 | 19 |
| Comparative Example | | | | | | | |
| 1 | 100 | — | 0.5 | $4 \times 10^3$ | Maleic anhydride | 3.3 | 37 |
| 2 | 100 | — | 1.9 | $2 \times 10^6$ | " | 0.3 | 4 |
| 3 | 100 | — | 1.9 | $2 \times 10^6$ | " | 18.0 | 205 |
| 4 | 100 | — | 1.9 | $2 \times 10^6$ | " | 3.0 | 35 |
| 5 | 100 | — | 1.9 | $2 \times 10^6$ | " | 3.0 | 35 |
| 6 | 60 | Ethylene | 2.0 | $1.4 \times 10^6$ | " | 3.2 | 36 |
| 7 | 100 | — | 1.9 | $2 \times 10^6$ | Acrylic acid | 1.6 | 12 |
| 8 | 100 | — | 1.9 | $2 \times 10^6$ | Maleic anhydride | 2.3 | 26 |

| | | Solubility* | Adhesion of coated film | | |
|---|---|---|---|---|---|
| | Post-chlorination product chlorine content (wt. %) | (100 g/l-toluene, 25° C.) | Initial | After treatment of water resistance | After treatment of gasoline resistance |
| Example | | | | | |
| 1 | 25 | ◎ | 100/100 | 100/100 | 100/100 |
| 2 | 25 | ◎ | 100/100 | 95/100 | 90/100 |
| 3 | 25 | ◎ | 100/100 | 100/100 | 100/100 |
| 4 | 15 | ○ | 100/100 | 100/100 | 100/100 |
| 5 | 25 | ◎ | 100/100 | 95/100 | 95/100 |
| 6 | 18 | ◎ | 100/100 | 100/100 | 100/100 |
| 7 | 12 | ◎ | 100/100 | 100/100 | 95/100 |
| 8 | 25 | ◎ | 100/100 | 100/100 | 100/100 |
| 9 | 25 | ◎ | 100/100 | 100/100 | 100/100 |
| Comparative Example | | | | | |
| 1 | 18 | ○ | 95/100 | 80/100 | 10/100 |
| 2 | 25 | ◎ | 90/100 | 0/100 | 0/100 |
| 3 | 28 | ◎ | 95/100 | 20/100 | 10/100 |
| 4 | 8 | X | — | — | — |
| 5 | 40 | Δ | 95/100 | 85/100 | 0/100 |
| 6 | 13 | ◎ | 95/100 | 75/100 | 10/100 |
| 7 | 25 | ◎ | 60/100 | 5/100 | 5/100 |
| 8 | 25 | Δ | 100/100 | 95/100 | 75/100 |

*◎: uniform, transparent.
○: uniform, opaque.
Δ: a part thereof is an insoluble matter.
X: not dissolved.

EXAMPLE 10

Twenty parts by weight of titanium oxide was added to 100 parts by weight of the post-chlorination product of the post-chlorination product. As a result, the mixture gelled and a uniform primer colored product could not be obtained as shown in Table 2.

TABLE 2

| | Condition colored primer | Condition of coated film | Adhesion of coated film | | |
|---|---|---|---|---|---|
| | | | Initial | After treatment of water resistance | After treatment of gasoline resistance |
| Example 10 | Solution with pigment uniformly dispersed | Uniform (good) | 100/100 | 100/100 | 100/100 |
| Comparative Example 9 | Gelled | Non-uniform (poor) | 70/100 | 40/100 | 20/100 |

To the primer obtained in Example 1 was added 5 parts by weight, 100 parts by weight of the post-chlorination product, of carbon black, and the mixture was stirred with a homomixer to afford a black-colored uniform primer.

Adhesion of a coated film using the above primer is shown in Table 3.

COMPARATIVE EXAMPLE 10

An attempt was made to conduct coloration of black by adding carbon black to the toluene solution of the post-chlorination product of the maleic acid graft-modified polymer formed in Comparative Example 9 in the same way as in Example 11. However, the mixture gelled and a uniform primer colored product was not obtained as shown in Table 3.

TABLE 3

| | Condition of colored primer | Condition of coated film | Adhesion of coated film | | |
|---|---|---|---|---|---|
| | | | Initial | After treatment of water resistance | After treatment of gasoline resistance |
| Example 11 | Solution with pigment uniformly dispersed | Uniform (good) | 100/100 | 100/100 | 100/100 |
| Comparative Example 11 | Gelled | Non-uniform (poor) | 90/100 | 70/100 | 40/100 |

What we claim is:

1. In a primer composition composed of 1 to 100 parts by weight of a chlorinated carboxyl group-containing α-olefin polymer and 100 parts by weight of an organic solvent therefor, the improvement comprising
   (i) said chlorinated carboxyl group-containing α-olefin polymer is a post-chlorination product (C) of a graft-modified propylene polymer (B) having a chlorine content of 10 to 35% by weight, said graft-modified propylene polymer (B) having an acid value of 6 to 187 mg-KOH/g-polymer and obtained by grafting a $C_4$–$C_{10}$ unsaturated dicarboxylic acid anhydride to a propylene polymer (A) having an intrinsic viscosity ($\eta$), determined at 135° C. in decalin, of 0.6 to 10 dl/g and comprising 85 to 100 mole% of propylene and 0 to 15 mole% of ethylene, or 70 to 100 mole% of propylene and 0 to 30 mole% of 1-butene, and
   (ii) said solvent is an organic solvent boiling at about 60° to about 200° C.

2. The composition of claim 1 wherein the intrinsic viscosity [$\eta$] of said propylene polymer [A] is 1 to 5 dl/g.

3. The composition of claim 1 wherein the melt viscosity of said propylene polymer [A], determined at 190° C. by ASTM-D 1238-57 T using 0.04±0.0002 inch orifice is at least 7,000 cp.

4. The composition of claim 1 wherein the chlorine content of the post-chlorination product (C) is 20 to 30% by weight.

5. The composition of claim 1 wherein the acid value f the resulting graft-modified propylene polymer (B) is 12 to 120 mg-KOH/g-polymer.

6. The composition of claim 1 wherein the melt viscosity of the propylene polymer (A) determined at 190° C. by ASTM-D 1238-57 T using 0.04±0.0002 inch orifice is at least 50,000 cp but at most $2 \times 10^7$ poise.

* * * * *

UNITED STATES PATENT AND TRADEMARK OFFICE
CERTIFICATE OF CORRECTION

PATENT NO. : 4,755,553

DATED : July 5, 1988

INVENTOR(S) : KOTARO KISHIMURA, ET AL.

It is certified that error appears in the above-identified patent and that said Letters Patent is hereby corrected as shown below:

IN THE CLAIMS

Column 14, line 43, claim 5, delete "f", insert --of--.

Signed and Sealed this

Twenty-ninth Day of November, 1988

Attest:

DONALD J. QUIGG

Attesting Officer   Commissioner of Patents and Trademarks